US011729802B2

(12) United States Patent
Marcone et al.

(10) Patent No.: US 11,729,802 B2
(45) Date of Patent: Aug. 15, 2023

(54) TECHNIQUES FOR ADDRESSING IAB NODE SWITCHING TIME

(71) Applicant: QUALCOMM Incorporated, San Diego, CA (US)

(72) Inventors: Alessio Marcone, Nuremberg (DE); Muhammad Nazmul Islam, Littleton, MA (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/064,592

(22) Filed: Oct. 6, 2020

(65) Prior Publication Data

US 2021/0105782 A1    Apr. 8, 2021

Related U.S. Application Data

(60) Provisional application No. 62/912,315, filed on Oct. 8, 2019.

(51) Int. Cl.
*H04W 72/04* (2023.01)
*H04W 72/53* (2023.01)
*H04W 88/14* (2009.01)
*H04W 72/0453* (2023.01)
(Continued)

(52) U.S. Cl.
CPC ......... *H04W 72/53* (2023.01); *H04W 72/046* (2013.01); *H04W 72/0446* (2013.01); *H04W 72/0453* (2013.01); *H04W 72/0473* (2013.01); *H04W 88/14* (2013.01)

(58) Field of Classification Search
None
See application file for complete search history.

(56) References Cited

U.S. PATENT DOCUMENTS

2021/0127389 A1*   4/2021   Liu .................... H04W 72/0446
2021/0153189 A1*   5/2021   Jo ......................... H04W 72/04

OTHER PUBLICATIONS

Ericsson: "Summary of 7.2.3.1 Enhancements to Support NR Backhaul Links", 3GPP Draft, 3GPP TSG RAN WG1 Meeting #94bis, R1-1811844, 3rd Generation Partnership Project (3GPP), Mobile Competence Centre, 650, Route Des Lucioles, F-06921 Sophia-Antipolis Cedex, France vol. RAN WG1, No. Chengdu, China, Oct. 8, 2018-Oct. 12, 2018, Oct. 9, 2018, XP051519169, 21 pages, Retrieved from the Internet: URL:http://www.3gpp.org/ftp/tsg%5Fran/WG1%5FRL1/TSGR1%5F94b/Docs/R1%2D1811844%2Ezip [retrieved on Oct. 9, 2018], Chapter 3 "Dynamic Resource Allocation between Backhaul and Access Links".

(Continued)

*Primary Examiner* — Willie J Daniel, Jr.
(74) *Attorney, Agent, or Firm* — Patterson & Sheridan, LLP

(57) ABSTRACT

The present disclosure provides techniques for addressing switching times of Integrated Access and Backhaul (IAB) child nodes. For example, a parent IAB node may determine a switching time for the child IAB node to switch from transmitting on a backhaul/uplink to a parent node (with transmit power control) to transmitting on an access/downlink to a user equipment (UE) or other child IAB node. The parent IAB node may then configure the IAB child node according to the determined switching time (e.g., by scheduling the IAB child node accordingly or setting one or more timing advance parameters).

28 Claims, 8 Drawing Sheets

(51) Int. Cl.
  *H04W 72/044* (2023.01)
  *H04W 72/0446* (2023.01)

(56) References Cited

OTHER PUBLICATIONS

Huawei et al., "Physical Layer Design for NR IAB", 3GPP Draft; R1-1810130, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Sep. 29, 2018, XP051517545, Retrieved from the Internet: URL:http://www.3gpp.org/ftp/tsg%5Fran/WG1%5FRL1/TSGR1%5F94b/Docs/R1%2D1810130%2Ezip [retrieved on Sep. 29, 2018], 18 pages.
International Search Report and Written Opinion—PCT/US2020/054540—ISA/EPO—dated Jan. 29, 2021.

* cited by examiner

TECHNIQUES FOR ADDRESSING IAB NODE SWITCHING TIME

PRIORITY CLAIM(S)

This application claims benefit of the priority to U.S. Provisional Application No. 62/912,315, filed on Oct. 8, 2019, which is expressly incorporated by reference in its entirety as if fully set forth below and for all applicable purposes.

BACKGROUND

Aspects of the present disclosure relate to wireless communications, and more particularly, to techniques for addressing Integrated Access and Backhaul (IAB) node switching time.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a first node of an integrated access and backhaul (IAB) network. The method generally includes determining, based on one or more factors, a switching time for a second node of the IAB network to switch between transmitting on an uplink backhaul and transmitting on a downlink access link, and configuring the second node to operate according to the determined switching time.

Certain aspects of the present disclosure are directed to an apparatus for wireless communication by a first node of an IAB network. The apparatus generally includes a memory and at least one processor coupled to the memory, the memory and the at least one processor being configured to determine, based on one or more factors, a switching time for a second node of the IAB network to switch between transmitting on an uplink backhaul and transmitting on a downlink access link, and configure the second node to operate according to the determined switching time.

Certain aspects of the present disclosure are directed to an apparatus for wireless communication by a first node of an IAB network. The apparatus generally includes means for determining, based on one or more factors, a switching time for a second node of the IAB network to switch between transmitting on an uplink backhaul and transmitting on a downlink access link, and means for configuring the second node to operate according to the determined switching time.

Certain aspects of the present disclosure are directed to a computer readable medium having instructions stored thereon for determining, based on one or more factors, a switching time for a second node of the IAB network to switch between transmitting on an uplink backhaul and transmitting on a downlink access link, and configuring the second node to operate according to the determined switching time.

Certain aspects provide a method for wireless communications by a second node of an IAB network. The method generally includes providing information, to a first node of the IAB network, regarding one or more factors that provide information regarding a switching time for the second node to switch between transmitting on an uplink backhaul and transmitting on a downlink access link, and receiving signaling from the first node configuring the second node to operate according to the determined switching time.

Certain aspects of the present disclosure are directed to an apparatus for wireless communication by a second node of an IAB network. The apparatus generally includes a memory and at least one processor coupled to the memory, the memory and the at least one processor being configured to provide information, to a first node of the IAB network, regarding one or more factors that provide information regarding a switching time for the second node to switch between transmitting on an uplink backhaul and transmitting on a downlink access link, and receive signaling from the first node configuring the second node to operate according to the determined switching time.

Certain aspects of the present disclosure are directed to an apparatus for wireless communication by a second node of an IAB network. The apparatus generally includes means for providing information, to a first node of the IAB network, regarding one or more factors that provide information regarding a switching time for the second node to switch between transmitting on an uplink backhaul and transmitting on a downlink access link, and means for receiving signaling from the first node configuring the second node to operate according to the determined switching time.

Certain aspects of the present disclosure are directed to a computer readable medium having instructions stored thereon for providing information, to a first node of the IAB network, regarding one or more factors that provide information regarding a switching time for the second node to switch between transmitting on an uplink backhaul and transmitting on a downlink access link, and receiving signaling from the first node configuring the second node to operate according to the determined switching time.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for addressing switching times of Integrated Access and Backhaul (IAB) child nodes. For example, a parent IAB node may determine a switching time for the child IAB node to switch from transmitting on a backhaul/uplink to a parent node (with transmit power control) to transmitting on an access/downlink to a user equipment (UE) or other child IAB node. The parent IAB node may then configure the IAB child node according to the determined switching time (e.g., by scheduling the IAB child node accordingly or setting one or more timing advance parameters).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
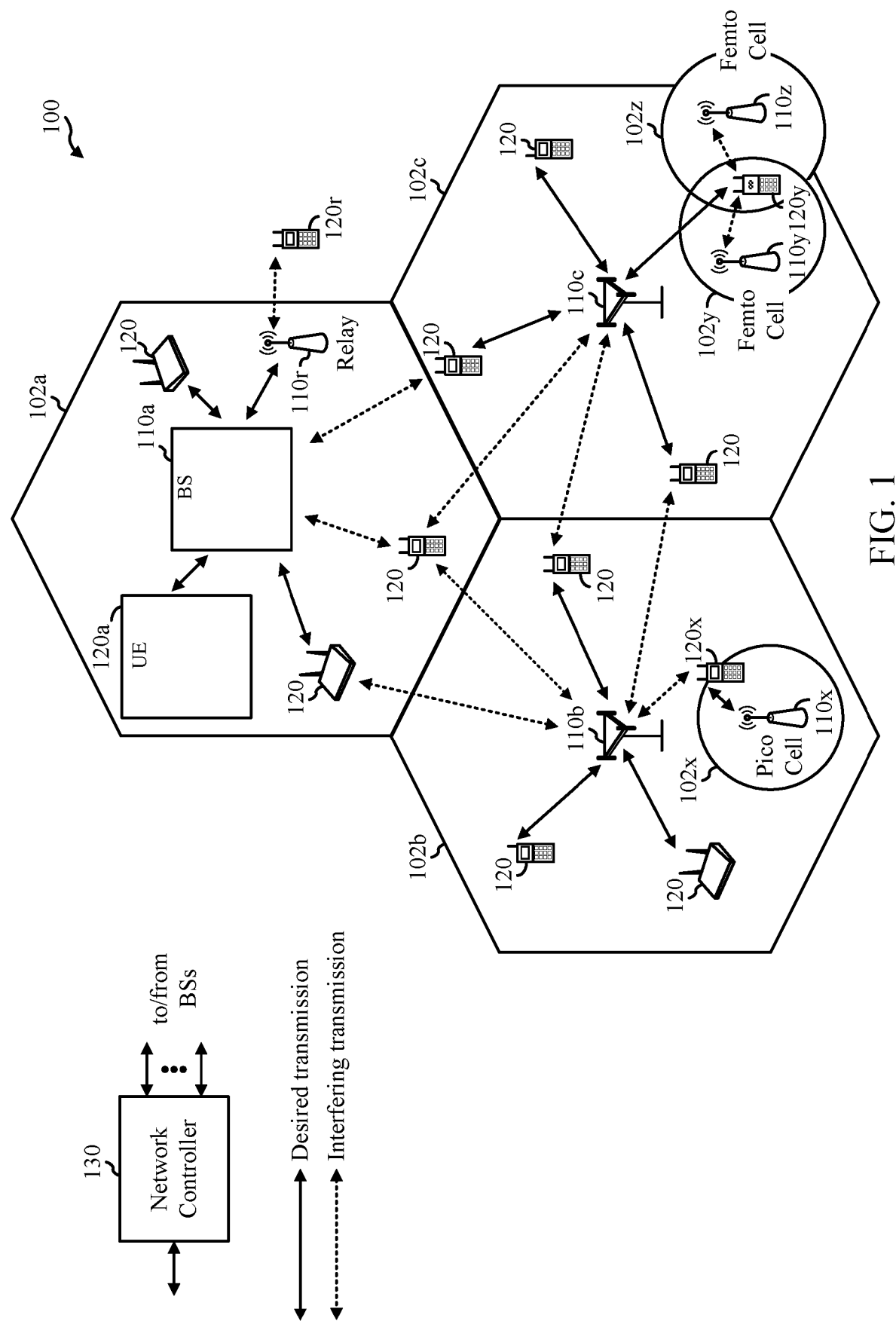
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
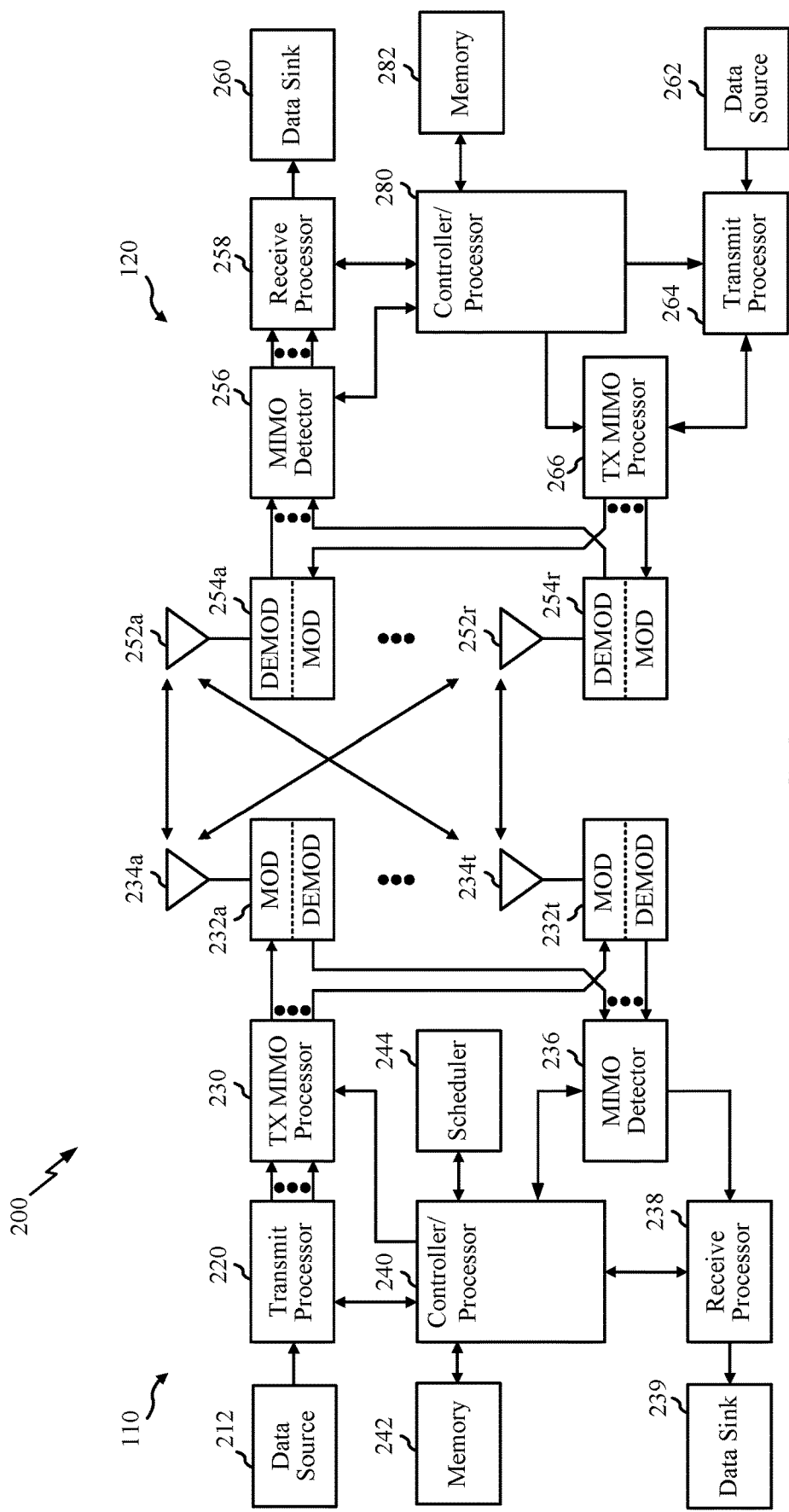
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

It should be noted that though FIG. 2 illustrates UE 120 communicating with a BS 110, a child IAB-node may similar communicate with a parent IAB-node and each may (e.g., respectively) have similar components as discussed with respect to FIG. 2. In other words, a child IAB-node may have similar components as UE 120 and may be configured to perform operations 700 of FIG. 7, while a parent IAB-node may have similar components as BS 110 and may be configured to perform operations 600 of FIG. 6.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
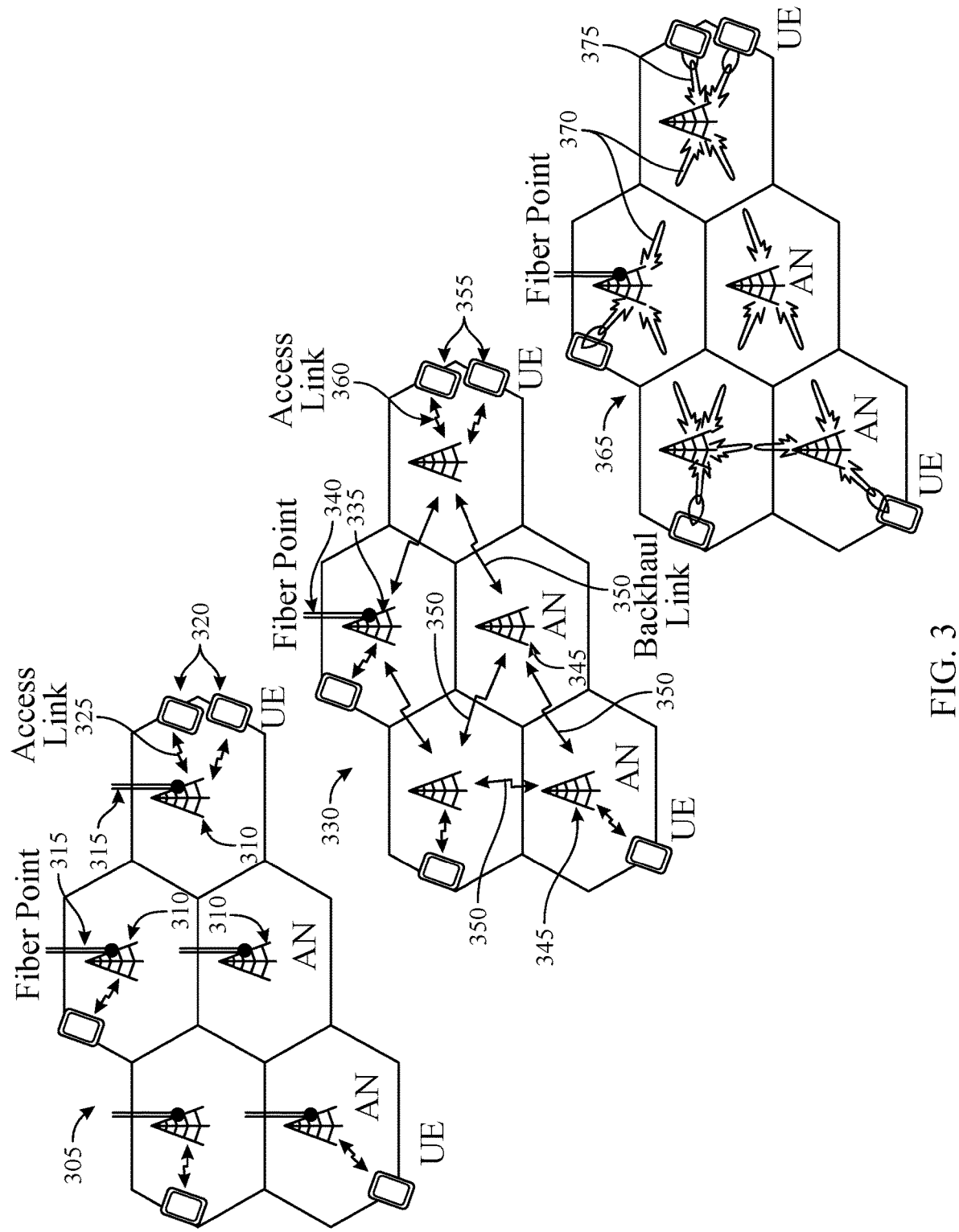
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
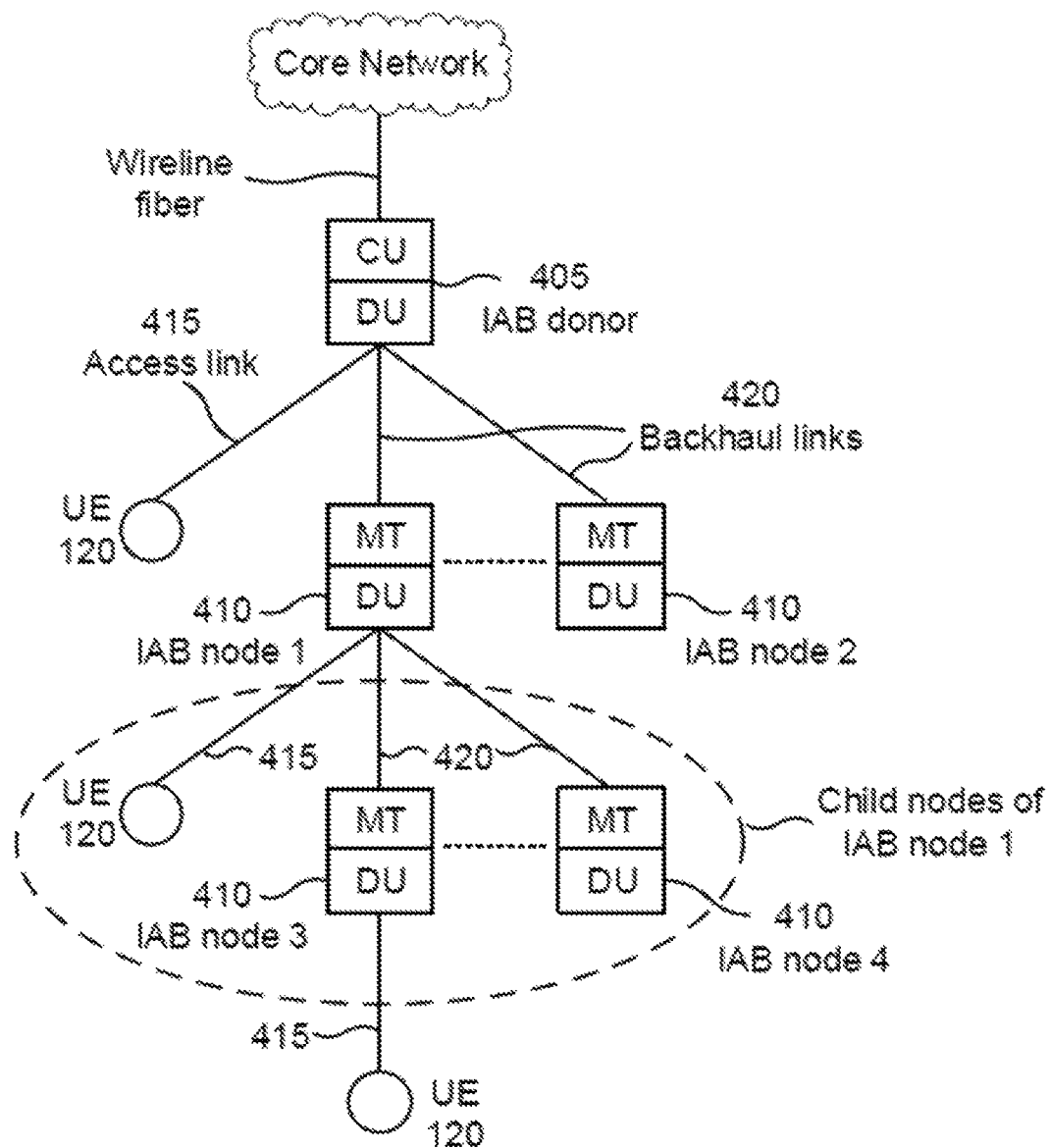
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB nodes, including layer-2 (L2) and layer-3 (L3) solutions and a particular architecture deployed may depend on what layers of protocol stack are implemented in the intermediate nodes (e.g., IAB nodes), for example, L2 relays may implement PHY/MAC/RLC layers.

Example Techniques for Addressing IAB Node Switching Time

In certain scenarios, switching time at an IAB child node may need to accommodate relatively large swings in transmit power levels. This may occur when switching between transmissions on the backhaul and access links. For example, IAB nodes have the capability of operating both access and backhaul in either uplink (UL) or downlink (DL) duplex directions. The transmit power back-off at an IAB node (e.g., an IAB child node) due to UL transmissions with power control and DL transmission without power control may require the node to switch between two different gain state levels (e.g., up to 50 dB back-off) in a relatively short time.

The large swing in transmit power levels may be due to the possibility that the child IAB node may transmit on the backhaul with relatively low power due to optimal placement of the child node relative to the parent.

Figure 5:
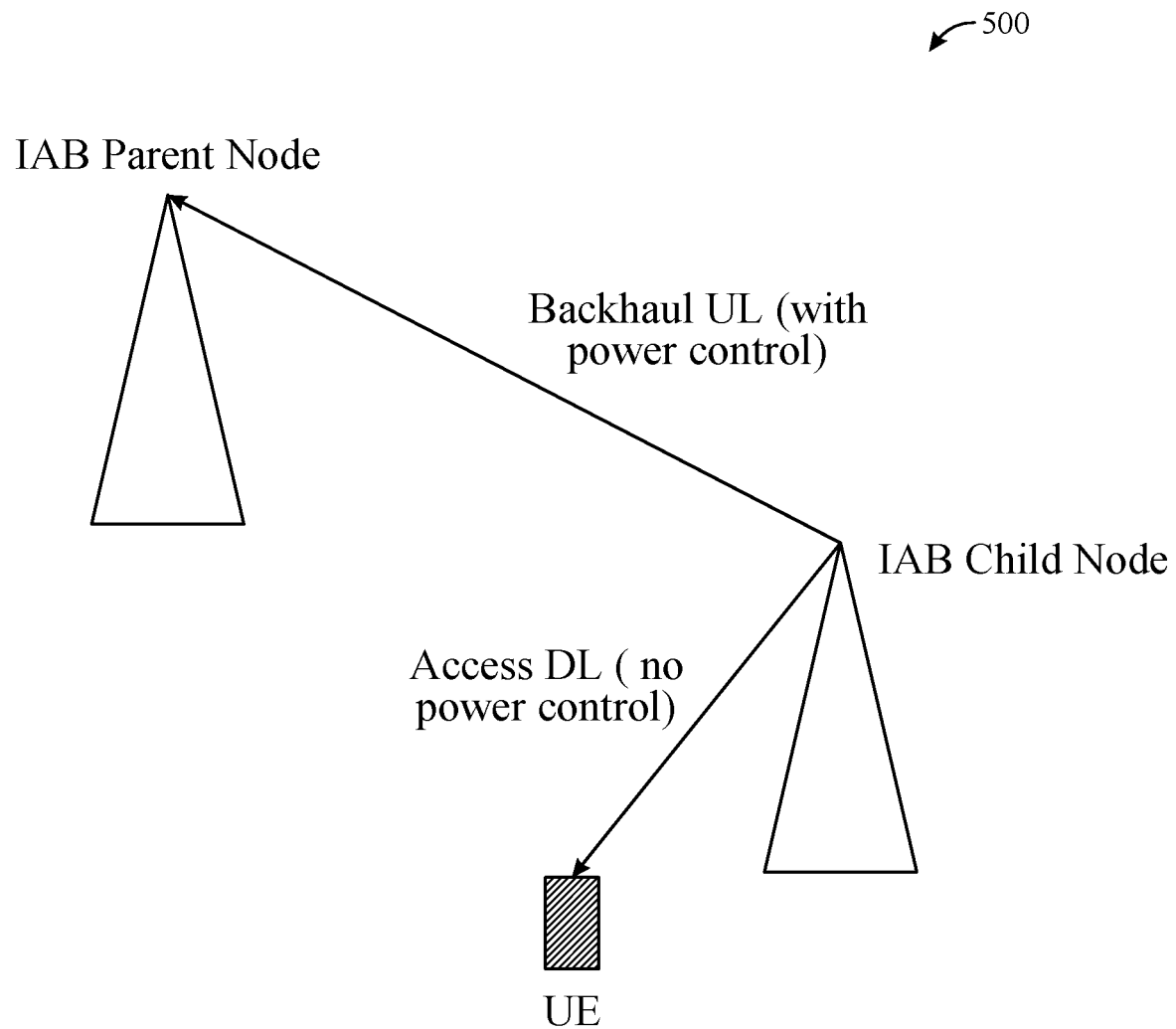
FIG. 5 illustrates an example IAB deployment, in which aspects of the present disclosure may be practiced.

For example, as illustrated in FIG. 5, a parent node may be placed at a substantial height to cover a given area and the child node may be placed lower in a direct line of site (LOS) which may result in low path loss. On the other hand, the child node may transmit on the downlink to a UE at close to full power (e.g., if the UE is at an edge of the cell coverage area of the child node).

The potential impact on switching time may be illustrated by considering a scenario in which the IAB child node is scheduled to transmit in UL backhaul at slot (or symbol) n and in access DL at slot (or symbol) n+1. Given the good channel conditions (e.g., from optimized deployment), the IAB child node can transmit at relatively low power in slot (or symbol) n and still meet the target SNR at the parent node receiver. At the same time, the IAB child node may be required to transmit at full power in the subsequent DL slot (or symbol) n+1 to guarantee signal coverage to distant UEs. As noted above, this power gap can be as large as 50 dB, which may imply a relatively large switching time at the IAB child node.

Currently the switching time is specified for UE and gNB as a fixed number depending on the frequency range (e.g., FR1 or FR2). To accommodate this switching time, two timing advance parameters for UE transmissions are defined:

$N_{TA}$: used for compensation of propagation delays; and $N_{TA\_offset}$: used to accommodate UL to DL switching times of both gNB and UE.

When configured with these time advance parameters, a UE may eventually advance its UL transmissions by an amount equal to $N_{TA\_offset}+N_{TA}$, so that both UE and gNB have enough time to switch from transmission (Tx)/reception (Rx) to Rx/Tx mode before the start of the DL slot.

This same approach may be followed for IAB nodes in the case of a (Rx↔Tx) switch between UL and DL slots. In such cases, an IAB node will have $N_{TA\_offset}$ [µs] to switch from the Rx state to the Tx state (and vice versa).

However, as noted above, a new scenario may arise in IAB where a single node may need to switch from a transmission on one link at one power level (e.g., mobile termination (MT) Tx in an UL slot) to transmission on another link at a different power level (e.g., to distributed unit (DU) Tx in DL slot). As noted above, the correspondent switching time may depend on the power transmitted in the two slots and, eventually, on the power class (e.g., the dynamic range) of the IAB node. In addition, the required switching time may depend on one or more of the following additional factors:

(1) Actual transmit power (e.g., as opposed to the power class) of a co-located DU (which may also depend, in turn, on the number of RBs that the co-located DU uses to communicate to its child/UE);

(2) A beam used by the co-located DU to communicate to its child/UE;

(3) If the communication beam used for transmission between the MT and the parent, and the communication beam used for transmission from the co-located DU and a grandchild/UE is adjacent, the required switching time may be small, and vice versa; and (4) MT and DU emission requirements which may need reconfiguration of baseband filters in the case the two requirements are different.

Some approaches to address the problem of large power switching time include reducing the transmitter dynamic range by increasing the minimum supported power. This solution comes at a cost, however. For example, in a scenario where a new radio (NR) base station is co-located with the IAB parent node, and operates in an adjacent frequency channel, the reduced dynamic range may result in an increase of interference and adversely impact throughput performance. Even if the emission requirements for the IAB child node are relatively stringent, performance may still be driven by receiver rejection (e.g., NR BS adjacent channel specifications may not be changed).

Accordingly, aspects of the present disclosure provide techniques for addressing switching time at a child IAB node that may account for large power swings noted above.

Figure 6:
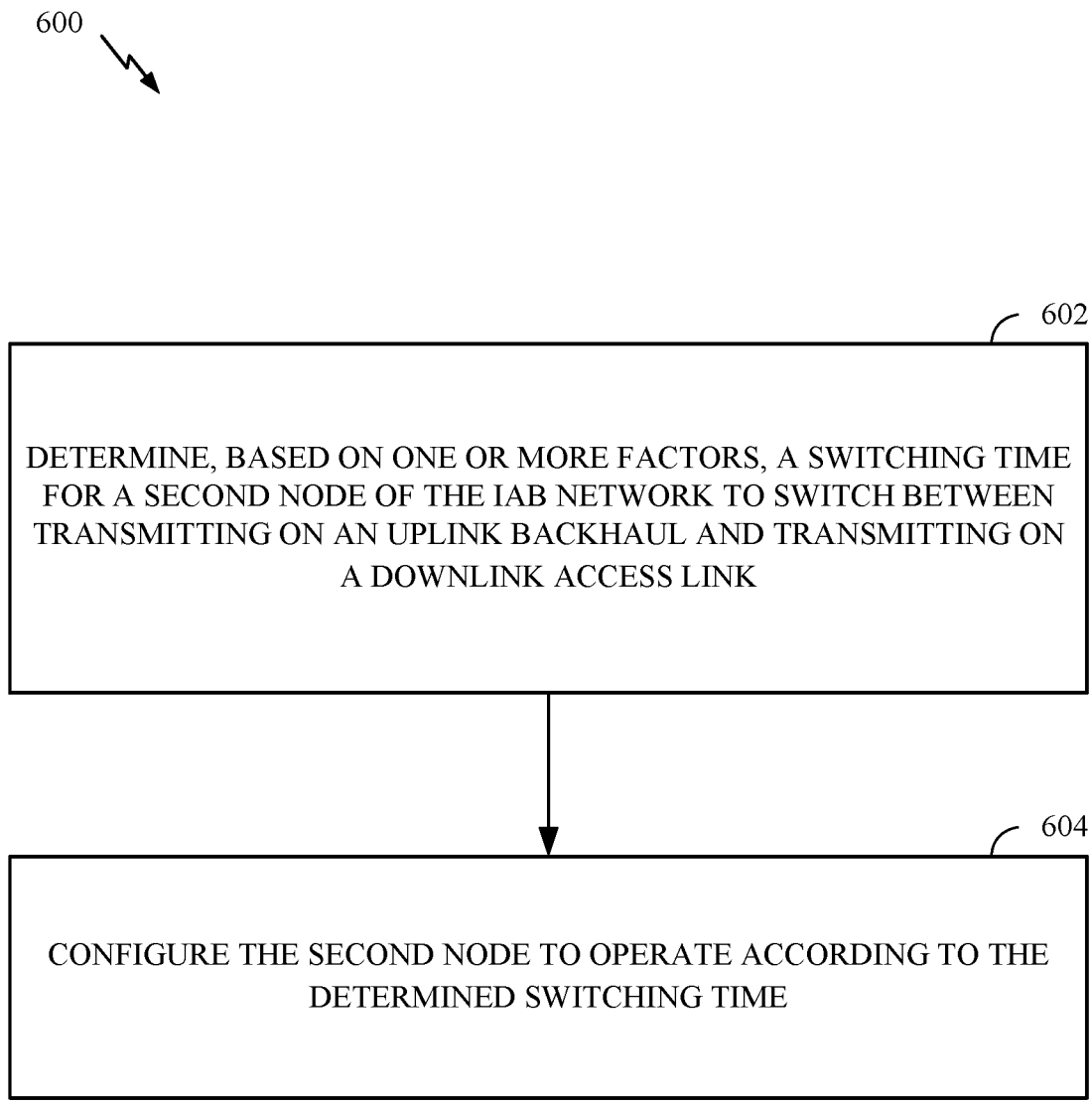
FIG. 6 illustrates a flow diagram illustrating example operations for wireless communication by a first node of an integrated access and backhaul (IAB) network, in accordance with various aspects of the disclosure.

FIG. 6 is a flow diagram illustrating example operations 600 for wireless communication by a first node of an IAB network, in accordance with certain aspects of the present disclosure. For example, operations 600 may be performed by a parent IAB node. Operations 600 may be implemented as software components that are executed and run on one or more processors (e.g., controller/processor 240 of FIG. 2). Further, the transmission and reception of signals by the first wireless communication device in operations 600 may be enabled, for example, by one or more antennas (e.g., antennas 234 of FIG. 2). In certain aspects, the transmission and/or reception of signals by the first wireless communication device may be implemented via a bus interface of one or more processors (e.g., controller/processor 230, 220, 238, 240, and 244) obtaining and/or outputting signals.

Operations 600 may begin, at 602, by determining, based on one or more factors, a switching time for a second node of the IAB network to switch between transmitting on an uplink backhaul and transmitting on a downlink access link. Further, at 604, the first node configures the second node to operate according to the determined switching time.

Figure 7:
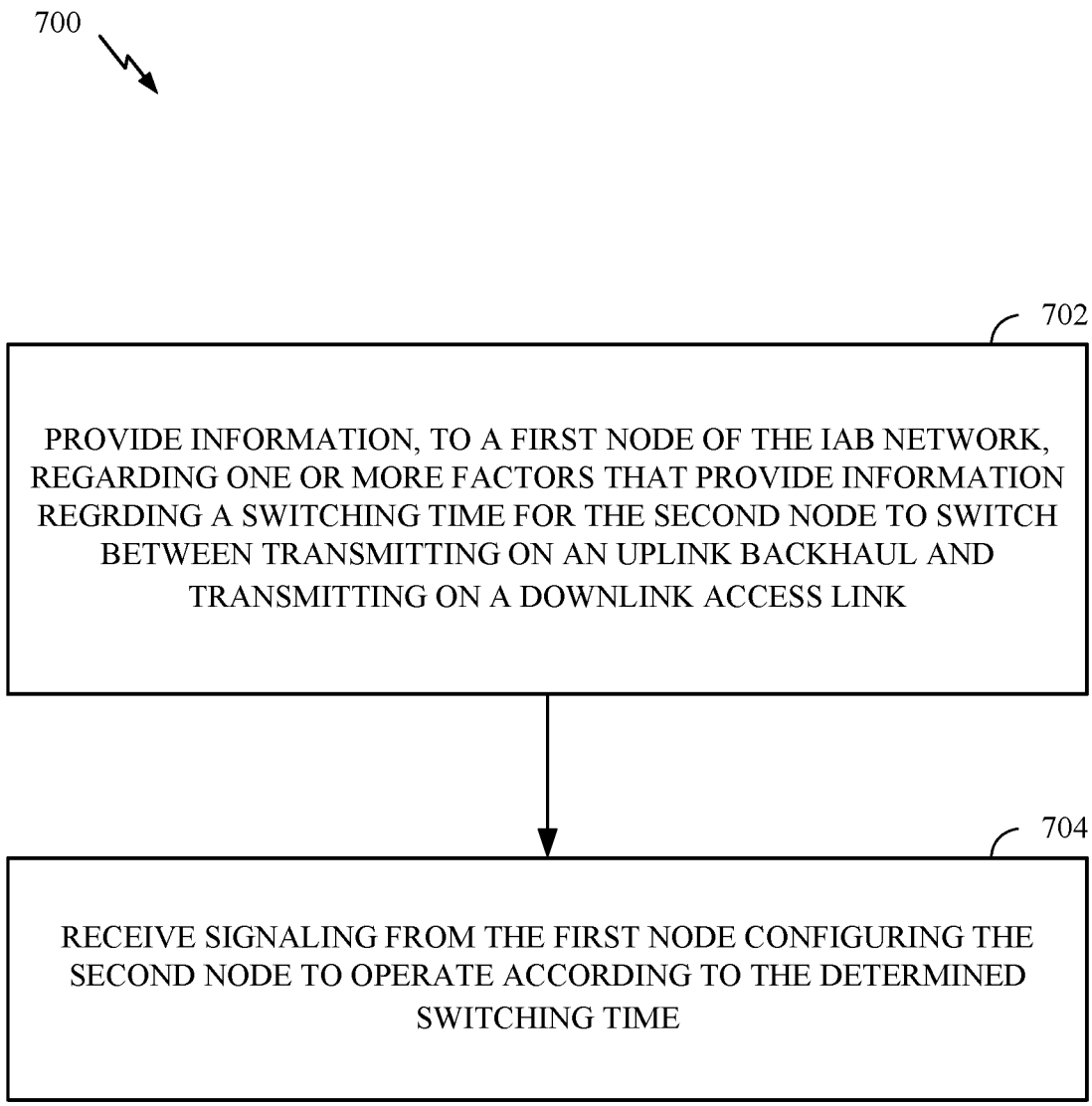
FIG. 7 illustrates a flow diagram illustrating example operations for wireless communication by a second node of an IAB network in accordance with various aspects of the disclosure.

FIG. 7 is a flow diagram illustrating example operations 700 for wireless communication by a second node of an IAB network, in accordance with certain aspects of the present disclosure. The operations 700 may be performed, for example, by a child IAB node. Operations 700 may be implemented as software components that are executed and run on one or more processors (e.g., controller/processor 280 of FIG. 2). Further, the transmission and reception of signals by the first wireless communication device in operations 700 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 700 begin, at 702, by providing information, to a first node of the IAB network, regarding one or more factors that provide information regarding a switching time for the second node to switch between transmitting on an uplink backhaul and transmitting on a downlink access link. At 704, the second node receives signaling from the first node configuring the second node to operate according to the determined switching time.

In general, a parent node may determine the child node IAB switching time from transmitting on the backhaul to transmitting on the access link (e.g., MT Tx ↔ DU Tx) dependent on one or more of the following factors:

(1) The power class of the IAB node;
(2) NR frequency range (e.g., FR1 or FR2);
(3) Actual transmit power of a co-located DU which, in turn, may depend on the number of RBs, the used channel (e.g. channel state information (CSI) reference signal (RS), physical downlink control channel (PDCCH), physical downlink shared channel (PDSCH), etc.) and the transmit power offset of that channel with respect to a fixed reference point of the co-located DU;
(4) The beams used by the MT and DU which, in turn, may depend on the panels and the adjacency of beams that are used by the MT and DU; and/or
(5) MT and DU emission requirements which may need reconfiguration of baseband filters.

In some cases, after entering a network, the MT (e.g., a component of the child node) may convey information regarding one or more of the above factors to the network through the parent node (e.g., through one or more combinations of physical uplink control channel (PUCCH), physical uplink shared channel (PUSCH), and/or physical random access channel (PRACH)). In some cases, the parent node or network may request that UEs convey this information (e.g., through one or more combinations of system information, media access control (MAC) control element (CE), radio resource control (RRC), and/or PDCCH).

Based on the information described above, the network or parent IAB node may configure the upstream timing of the MT through timing advance parameters. In some cases, the parent node may schedule the MT to allow sufficient switching time between DU and MT.

In some cases, MT timing advance may be configured to ensure that the gap between configured upstream MT Tx and downstream DU Tx may be greater than the IAB switching time between MT Tx and DU Tx (e.g., MT TX↔DU TX switching time).

In some cases, the network and/or parent node may decide to modify the $N_{TA}$ parameter so that it compensates for propagation losses and the IAB MT Tx↔DU Tx switching time. In this case, a timing offset parameter (e.g., $N_{TA\_offset}$) may not be changed. In other cases, the network/parent node may decide to modify the timing offset parameter (e.g., $N_{TA\_offset}$) so that it accommodates the IAB MT Tx↔DU Tx switching time. In this case, the $N_{TA}$ parameter may not be changed, but there may need to be standards changes to account for a dynamic $N_{TA\_offset}$.

In some cases, the network and/or parent node can decide to signal an additional (e.g., a new) timing advance parameter (e.g., $AN_{TA}$), in addition to the conventional parameters of $N_{TA\_offset}$ and $N_{TA}$, so that the network and/or parent node can accommodate IAB MT Tx↔DU Tx switching time. In this case neither $N_{TA}$ nor $N_{TA\_offset}$ parameters may be changed, but the additional timing advance parameter ($AN_{TA}$) may need to be defined in the standard.

In some cases, one or more of the MT timing advance parameters may be configured to optimize resource usage and network throughput (e.g., to adjust UL or DL transmit opportunities). For example, a parent node may occasionally decide to signal timing advance parameters to accommodate its switching time, for example, in the case of a heavy DL load.

Figure 8:
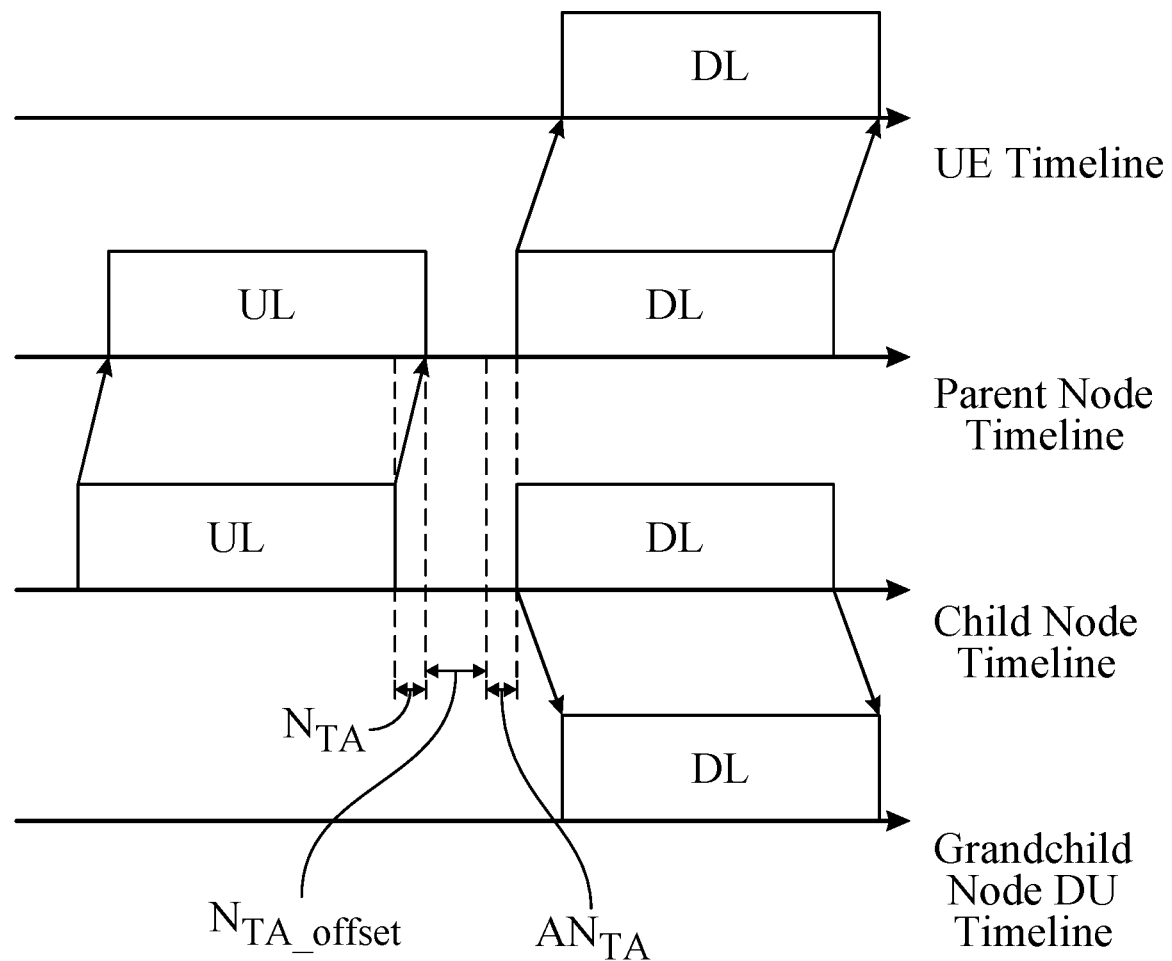
FIG. 8 illustrates application of example timing advance parameters, in accordance with various aspects of the disclosure.

FIG. 8 illustrates an example of MT timing advance utilizing the new timing advance parameter $AN_{TA}$. In the illustrated example, the parent node switches from UL Rx to DL Tx (e.g., as a conventional gNB). The switching time typically needs to be contained within $N_{TA\_offset}$ for the considered power class. However, in this example, this gap is larger than $N_{TA\_offset}$, in order to accommodate child node MT Tx to DU Tx switching time. In other cases, depending on the factors mentioned above (e.g., lower class, frequency range, actual transmit power, beams, and/or emission requirements), the gap may be larger or smaller than $N_{TA\_offset}$.

To facilitate understanding, the example illustrated in FIG. 8 represents the situation in which the additional timing advance parameter ($AN_{TA}$) is defined so that $N_{TA\_offset}+N_{TA}$ $AN_{TA}$ fits the MT to DU switch at the child node. While $AN_{TA}$ is represented as a positive quantity for the sake of illustration, it can also have a negative value. For example, in the case the MT Tx to DU Tx, the switching time of the child node is smaller than the DU Rx to DU/MT Tx of the parent node.

As noted above, the parent node may calculate $AN_{TA}$ so that $N_{TA}$ $N_{TA\_offset}+AN_{TA}$ is at least equal to child switch time, after the child node signals its switching capability. In this case, the parent node will have a switching time between UL and DL smaller or larger than $AN_{TA}+N_{TA\_offset}$ based on the computed value of $AN_{TA}$.

In case the parent switching time being smaller than $AN_{TA}+N_{TA\_offset}$, the parent IAB node can use the remaining time to enlarge its own DL opportunity and schedule additional UEs/child nodes. In such a case, however, the scheduler may attempt to ensure that these additional UEs are ready for before-hand reception (e.g., by only scheduling UEs that were not transmitting in a previous UL opportunity).

In case the parent switching time (e.g., from DU Rx to DU Tx or from DU Rx to MT Tx) being larger than $AN_{TA}+N_{TA\_Offset}$ (e.g., occurring for negative values of $AN_{TA}$), the parent node may perform different actions, as described below.

In some cases the parent node may set $AN_{TA}$ to:

$$AN_{TA}=\text{parent}_{switch\_time}-N_{TA\_offset}$$

In case the parent node switching time is exactly equal to $N_{TA\_Offset}$, $AN_{TA}$ will then equal 0 even if the value of $AN_{TA}$ desired at the child node is negative. At this point, the parent node may signal to the IAB child node to advance its UL transmission by $N_{TA}$ parent$_{switch\_time}$. The child IAB node will have the absolute value of $AN_{TA}$, (e.g., $|AN_{TA}|\mu s$) left after MT to DU switching before the start of next DL opportunity and can use this remaining time to enlarge its next DL opportunity and schedule additional UEs/child nodes.

In some cases, the parent node may signal the IAB child node to enlarge its UL transmission by the absolute value of $AN_{TA}$ ($|AN_{TA}|$) while still advancing its timing by $N_{TA}+N_{TA\_offset}$, and the parent node may blank a few of the subsequent DL symbols to accommodate its switching time If the difference between the IAB parent node switching time and $AN_{TA}+N_{TA\_offset}$ is greater than N symbols, but less than, for example, N+0.5 (or N+0.75 or N+0.875) symbols with respect to the subcarrier spacing (SCS) of the UE DL BWP (where N is an integer), the IAB child node may be signaled to enlarge its UL transmission by $|AN_{TA}|$ (while still advancing its timing by $N_{TA}$ $N_{TA\_Offset}$). In such cases, the parent node may opportunistically increase its DL SCS, thereby shortening the DL symbol duration, in order to accommodate its switching time and to avoid the blanking of a longer symbol with a smaller SCS.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

EXAMPLE EMBODIMENTS

Embodiment 1: A method for wireless communications by a first node of an integrated access and backhaul (IAB) network, comprising determining, based on one or more factors, a switching time for a second node of the IAB network to switch between transmitting on an uplink backhaul and transmitting on a downlink access link; and configuring the second node to operate according to the determined switching time.

Embodiment 2: The method of Embodiment 1, wherein the one or more factors comprise a power class of the second node; a frequency range in which the second node is operating; an actual transmit power for a transmission on the downlink access link; or one or more beams used for transmitting on the uplink backhaul and transmitting on the downlink access link.

Embodiment 3: The method of Embodiment 2, further comprising receiving signaling from the second node indicating information regarding one or more of the factors.

Embodiment 4: The method of Embodiment 2 or 3, further comprising sending a request for the second node to provide information regarding the factors; and receiving signaling, from the second node, of the information in response to the request.

Embodiment 5: The method of Embodiment 4, wherein the request is sent via at least one of: system information (SI), media access control (MAC) control element (CE), radio resource control (RRC), or a physical downlink control channel (PDCCH).

Embodiment 6: The method of any of Embodiments 1-5, wherein configuring the second node comprises scheduling the second node for transmission on the uplink backhaul to accommodate the determined switching time.

Embodiment 7: The method of any of Embodiments 1-6, wherein configuring the second node comprises setting one or more timing advance parameters based on the determined switching time; and signaling the timing advance parameters to the second node.

Embodiment 8: The method of Embodiment 7, wherein setting the one or more timing advance parameters comprises modifying a timing advance parameter without adjusting a timing advance offset parameter.

Embodiment 9: The method of Embodiment 7 or 8, wherein setting the one or more timing advance parameters comprises modifying a timing advance offset parameter without adjusting a timing advance parameter.

Embodiment 10: The method of any of Embodiments 7-9, wherein the one or more parameters comprise a first timing advance parameter, a timing advance offset parameter, and a second timing advance parameter.

Embodiment 11: The method of Embodiment 10, wherein the second timing advance parameter can indicate a positive or negative timing advance value.

Embodiment 12: The method of Embodiment 10 or 11, wherein the second timing advance parameter is calculated so a sum of the first timing advance parameter, timing advance offset parameter, and second timing advance parameter is at least equal to the determined switching time.

Embodiment 13: The method of Embodiment 12, further comprising, if a switching time at the first node is less than the sum of the timing advance offset parameter and the second timing advance parameter, using a difference in time to increase a downlink opportunity.

Embodiment 14: The method of Embodiment 13, further comprising using the increased downlink opportunity to schedule an additional one or more other nodes or user equipments (UEs).

Embodiment 15: The method of any of Embodiments 12-14, further comprising, if a switching time at the first node is larger than the sum of the timing advance offset parameter and the second timing advance parameter adjusting the second timing advance parameter so the first node switching time is not smaller than the sum of the timing advance offset parameter and the second timing advance parameter; signaling the second node to increase its uplink backhaul transmission time and blanking some downlink symbols by the first node; or signaling the second node to increase its uplink backhaul transmission time and increasing a downlink subcarrier spacing (SCS) by the first node.

Embodiment 16: The method of any of Embodiments 7-15, wherein the one or more timing advance parameters are also set to optimize at least one of resource usage or network throughput.

Embodiment 17: A method for wireless communications by a second node of an IAB network, comprising: providing information, to a first node of the IAB network, regarding one or more factors that provide information regarding a switching time for the second node to switch between transmitting on an uplink backhaul and transmitting on a downlink access link; and receiving signaling from the first node configuring the second node to operate according to the switching time.

Embodiment 18: The method of Embodiment 17, wherein the one or more factors comprise a power class of the second node; a frequency range in which the second node is operating; an actual transmit power for a transmission on the downlink access link; or one or more beams used for transmitting on the uplink backhaul and transmitting on the downlink access link.

Embodiment 19: The method of Embodiment 17 or 18, wherein the information is provided upon entering the IAB network.

Embodiment 20: The method of any of Embodiments 17-19, further comprising receiving a request from the first node to provide the information; and providing the information in response to the request.

Embodiment 21: The method of Embodiment 20, wherein the request is received via at least one of: SI, MAC-CE, RRC, or a PDCCH.

Embodiment 22: The method of any of Embodiments 17-21, wherein the signaling from the first node comprises signaling of one or more timing advance parameters.

Embodiment 23: The method of Embodiment 22, wherein the one or more timing advance parameters comprise a first timing advance parameter, a timing advance offset parameter, and a second timing advance parameter.

Embodiment 24: The method of Embodiment 23, wherein the second timing advance parameter can indicate a positive or negative timing advance value.

Embodiment 25: The method of Embodiment 24, further comprising increasing an uplink transmission opportunity or downlink transmission opportunity based on the second timing advance parameter.

Embodiment 26: The method of any of Embodiments 22-25, further comprising receiving signaling from the first node to increase an uplink transmission opportunity.

Embodiment 27: An apparatus for wireless communications by a first node of an IAB network, comprising means for determining, based on one or more factors, a switching time for a second node of the IAB network to switch between transmitting on an uplink backhaul and transmitting on a downlink access link; and means for configuring the second node to operate according to the determined switching time.

Embodiment 28: The apparatus of Embodiment 27, wherein the one or more factors comprise a power class of the second node; a frequency range in which the second node is operating; an actual transmit power for a transmission on the downlink access link; or one or more beams used for transmitting on the uplink backhaul and transmitting on the downlink access link.

Embodiment 29: An apparatus for wireless communications by a second node of an IAB network, comprising means for providing information, to a first node of the IAB network, regarding one or more factors that provide information regarding a switching time for the second node to switch between transmitting on an uplink backhaul and transmitting on a downlink access link; and means for receiving signaling from the first node configuring the second node to operate according to the switching time.

Embodiment 30: The apparatus of Embodiment 29, wherein the one or more factors comprise a power class of the second node; a frequency range in which the second node is operating; an actual transmit power for a transmission on the downlink access link; or one or more beams used for transmitting on the uplink backhaul and transmitting on the downlink access link.

Embodiment 31: An apparatus for wireless communications by a first node of an IAB network, comprising at least one processor and a memory configured to determine, based on one or more factors, a switching time for a second node of the IAB network to switch between transmitting on an uplink backhaul and transmitting on a downlink access link; and configure the second node to operate according to the determined switching time.

Embodiment 32: An apparatus for wireless communications by a second node of an IAB network, comprising at least one processor and a memory configured to provide information, to a first node of the IAB network, regarding one or more factors that provide information regarding a switching time for the second node to switch between transmitting on an uplink backhaul and transmitting on a downlink access link; and receive signaling from the first node configuring the second node to operate according to the switching time.

Embodiment 33: A computer readable medium having instructions stored thereon for determining, based on one or more factors, a switching time for a second node of the IAB network to switch between transmitting on an uplink backhaul and transmitting on a downlink access link, and configuring the second node to operate according to the determined switching time.

Embodiment 34: A computer readable medium having instructions stored thereon for providing information, to a first node of the IAB network, regarding one or more factors that provide information regarding a switching time for the second node to switch between transmitting on an uplink backhaul and transmitting on a downlink access link, and receiving signaling from the first node configuring the second node to operate according to the determined switching time.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 600 of FIG. 6 and/or operations 700 of FIG. 7.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a first node of an integrated access and backhaul (IAB) network, comprising:
   at least one processor and a memory coupled to the at least one processor, the at least one processor and memory configured to:
   receive information, from a second node of the IAB network, regarding one or more factors that provide information regarding a switching time for the second node to switch between transmitting on an uplink backhaul and transmitting on a downlink access link;
   determine, by the first node, based on the one or more factors, the switching time for the second node of the IAB network to switch between transmitting on the uplink backhaul and transmitting on the downlink access link; and
   configure the second node to operate according to the determined switching time, comprising scheduling the second node for transmission on the uplink backhaul to accommodate the determined switching time.

2. The apparatus of claim 1, wherein the one or more factors comprise:
   a power class of the second node;
   a frequency range in which the second node is operating;
   an actual transmit power for a transmission on the downlink access link; or
   one or more beams used for transmitting on the uplink backhaul or transmitting on the downlink access link.

3. The apparatus of claim 2, wherein the at least one processor and memory are further configured to receive signaling from the second node indicating the information regarding the one or more of the factors.

4. The apparatus of claim 1, wherein the at least one processor and memory are further configured to:
send a request for the second node to provide the information regarding the one or more factors; and
receive signaling, from the second node, of the information in response to the request.

5. The apparatus of claim 4, wherein the at least one processor and memory are further configured to send the request via at least one of: system information (SI), media access control (MAC) control element (CE), radio resource control (RRC), or a physical downlink control channel (PDCCH).

6. The apparatus of claim 1, wherein the at least one processor and memory being configured to configure the second node comprises the at least one processor and memory being configured to
set one or more timing advance parameters based on the determined switching time; and
signal the timing advance parameters to the second node.

7. The apparatus of claim 6, wherein the at least one processor and memory being configured to set the one or more timing advance parameters comprises the at least one processor and memory being configured to modify a timing advance parameter without adjusting a timing advance offset parameter.

8. The apparatus of claim 6, wherein the at least one processor and memory being configured to set the one or more timing advance parameters comprises the at least one processor and memory being configured to modify a timing advance offset parameter without adjusting a timing advance parameter.

9. The apparatus of claim 6, wherein the one or more timing advance parameters comprise a first timing advance parameter, a timing advance offset parameter, and a second timing advance parameter.

10. The apparatus of claim 9, wherein the second timing advance parameter can indicate a positive or negative timing advance value.

11. The apparatus of claim 9, wherein the second timing advance parameter is calculated so a sum of the first timing advance parameter, timing advance offset parameter, and second timing advance parameter is at least equal to the determined switching time.

12. The apparatus of claim 11, wherein the at least one processor and memory are further configured to, if a switching time at the first node is less than the sum of the timing advance offset parameter and the second timing advance parameter, use a difference in time to increase a downlink opportunity.

13. The apparatus of claim 12, wherein the at least one processor and memory are further configured to use the increased downlink opportunity to schedule an additional one or more other nodes or user equipments (UEs).

14. The apparatus of claim 11, wherein the at least one processor and memory are further configured to, if a switching time at the first node is larger than the sum of the timing advance offset parameter and the second timing advance parameter:
adjust the second timing advance parameter so the first node switching time is not smaller than the sum of the timing advance offset parameter and the second timing advance parameter;
signal the second node to increase its uplink backhaul transmission time and blank some downlink symbols by the first node; or
signal the second node to increase an uplink backhaul transmission time of the second node and increase a downlink subcarrier spacing (SCS) used by the first node.

15. The apparatus of claim 6, wherein the at least one processor and memory are further configured to set the one or more timing advance parameters further based on at least one of resource usage or network throughput.

16. An apparatus for wireless communications by a second node of an integrated access and backhaul (IAB) network, comprising:
at least one processor and a memory coupled to the at least one processor, the at least one processor and memory configured to:
provide information, to a first node of the IAB network, regarding one or more factors that provide information regarding a switching time for the second node to switch between transmitting on an uplink backhaul and transmitting on a downlink access link; and
receive signaling from the first node configuring the second node to operate according to the switching time, wherein the switching time depends on the one or more factors, and wherein configuring the second node comprises scheduling the second node for transmission on the uplink backhaul to accommodate the determined switching time.

17. The apparatus of claim 16, wherein the one or more factors comprise:
a power class of the second node;
a frequency range in which the second node is operating;
an actual transmit power for a transmission on the downlink access link; or
one or more beams used for transmitting on the uplink backhaul or transmitting on the downlink access link.

18. The apparatus of claim 16, wherein the at least one processor and memory are further configured to provide the information upon entering the IAB network.

19. The apparatus of claim 16, wherein the at least one processor and memory are further configured to:
receive a request from the first node to provide the information; and
provide the information in response to the request.

20. The apparatus of claim 19, wherein the at least one processor and memory are further configured to receive the request via at least one of: system information (SI), media access control (MAC) control element (CE), radio resource control (RRC), or a physical downlink control channel (PDCCH).

21. The apparatus of claim 16, wherein the signaling from the first node comprises:
signaling of one or more timing advance parameters.

22. The apparatus of claim 21, wherein the one or more timing advance parameters comprise a first timing advance parameter, a timing advance offset parameter, and a second timing advance parameter.

23. The apparatus of claim 22, wherein the second timing advance parameter can indicate a positive or negative timing advance value.

24. The apparatus of claim 23, wherein the at least one processor and memory are further configured to increase an uplink transmission opportunity or downlink transmission opportunity based on the second timing advance parameter.

25. The apparatus of claim 21, wherein the at least one processor and memory are further configured to receive signaling from the first node to increase an uplink transmission opportunity.

26. A method for wireless communications by a first node of an integrated access and backhaul (IAB) network, comprising:

receiving information, from a second node of the TAB network, regarding one or more factors that provide information regarding a switching time for the second node to switch between transmitting on an uplink backhaul and transmitting on a downlink access link;

determining, by the first node, based on the one or more factors, the switching time for the second node of the TAB network to switch between transmitting on the uplink backhaul and transmitting on the downlink access link; and configuring the second node to operate according to the determined switching time, wherein configuring the second node comprises scheduling the second node for transmission on the uplink backhaul to accommodate the determined switching time.

27. The method of claim 26, wherein the one or more factors comprise:

a power class of the second node;

a frequency range in which the second node is operating;

an actual transmit power for a transmission on the downlink access link; or one or more beams used for transmitting on the uplink backhaul or transmitting on the downlink access link.

28. A method for wireless communications by a second node of an integrated access and backhaul (IAB) network, comprising:

providing information, to a first node of the TAB network, regarding one or more factors that provide information regarding a switching time for the second node to switch between transmitting on an uplink backhaul and transmitting on a downlink access link; and receiving signaling from the first node configuring the second node to operate according to the switching time, wherein the switching time depends on the one or more factors, and wherein configuring the second node comprises scheduling the second node for transmission on the uplink backhaul to accommodate the determined switching time.

* * * * *